(12) United States Patent
Kharsa et al.

(10) Patent No.: US 9,528,868 B2
(45) Date of Patent: Dec. 27, 2016

(54) DUAL SENSOR HEAD CONFIGURATION IN A FLUID FLOW OR LIQUID LEVEL SWITCH

(71) Applicant: FLUID COMPONENTS INTERNATIONAL, LLC, San Marcos, CA (US)

(72) Inventors: John Kharsa, Escondido, CA (US); Eddie Iizumi, San Diego, CA (US)

(73) Assignee: FLUID COMPONENTS INTERNATIONAL LLC, San Marcos, CA (US)

( * ) Notice: Subject to any disclaimer, the term of this patent is extended or adjusted under 35 U.S.C. 154(b) by 0 days.

(21) Appl. No.: 14/973,627

(22) Filed: Dec. 17, 2015

(65) Prior Publication Data
US 2016/0187174 A1  Jun. 30, 2016

Related U.S. Application Data

(60) Provisional application No. 62/093,344, filed on Dec. 17, 2014.

(51) Int. Cl.
*G01F 1/69*  (2006.01)
*G01F 23/24* (2006.01)

(52) U.S. Cl.
CPC ............. *G01F 1/69* (2013.01); *G01F 23/247* (2013.01)

(58) Field of Classification Search
CPC .......... G01F 1/69; G01F 23/247; G01F 23/00; G01F 23/24; G01F 23/246
See application file for complete search history.

(56) References Cited

U.S. PATENT DOCUMENTS

| | | |
|---|---|---|
| 3,366,942 A | 1/1968 | Deane |
| 3,898,638 A | 8/1975 | Deane et al. |
| 4,778,538 A | 10/1988 | Lyman |
| 4,899,584 A | 2/1990 | McQueen |
| 4,901,061 A * | 2/1990 | Twerdochlib ............ G01K 3/14 340/501 |
| 4,967,593 A | 11/1990 | McQueen |
| 5,434,555 A | 7/1995 | Haynes |
| 5,600,528 A | 2/1997 | McQueen |
| 5,880,365 A | 3/1999 | Olin et al. |
| 5,913,250 A | 6/1999 | Wible |
| 6,208,254 B1 | 3/2001 | McQueen et al. |
| 6,536,273 B2 | 3/2003 | Schrittenlacher |
| 6,543,283 B2 | 4/2003 | Acht et al. |
| 6,666,578 B2 | 12/2003 | Gibbs et al. |
| 6,672,154 B1 | 1/2004 | Yamagishi et al. |
| 7,054,767 B2 | 5/2006 | Eldridge |
| 7,107,835 B2 | 9/2006 | Korniyenko et al. |
| 7,191,645 B2 | 3/2007 | Wible |
| 7,197,953 B2 | 4/2007 | Olin |
| 8,529,127 B2 | 9/2013 | Pfau et al. |

(Continued)

FOREIGN PATENT DOCUMENTS

WO  2014046675 A1  3/2014

*Primary Examiner* — Lisa Caputo
*Assistant Examiner* — Philip Cotey
(74) *Attorney, Agent, or Firm* — The Maxham Firm

(57) ABSTRACT

A fluid flow or liquid level switch providing a high level of reliability. Dual reference sensors in a single thermowell operates with two active, independent sensors, which operate with independent electronics having dual signal outputs, to provide constant and continuous redundancy in operation.

13 Claims, 4 Drawing Sheets

(56) References Cited

U.S. PATENT DOCUMENTS

| | | | |
|---|---|---|---|
| 2004/0081589 A1* | 4/2004 | Alexanian | B01J 19/0046 422/400 |
| 2009/0125127 A1* | 5/2009 | Bergman, Jr. | B01D 53/0454 700/80 |
| 2012/0144928 A1* | 6/2012 | Wible | G01F 1/6842 73/861 |
| 2013/0208758 A1 | 8/2013 | Towner et al. | |

* cited by examiner

DUAL SENSOR HEAD CONFIGURATION IN A FLUID FLOW OR LIQUID LEVEL SWITCH

CROSS REFERENCE TO RELATED APPLICATIONS

This application claims the benefit of U.S. provisional application Ser. No. 62/093,144, filed 17 Dec. 2014, which is incorporated herein by reference in its entirety.

FIELD OF INVENTION

This device relates to thermal type flow and liquid level sensors and more particularly to such a device functioning as a flow or liquid level switch that provides constant and continuous redundancy with regard to the fluid medium or process fluid being sensed.

BACKGROUND OF THE INVENTION

Heated flow and liquid level sensors have been available for at least several decades. Examples of such devices and the manner in which they function are shown in U.S. Pat. Nos. 3,366,942, 3,898,638, 4,899,584, 4,967,593, and 5,600,528.

Where safety is of high concern, an extremely low failure rate for such sensors is a goal to strive for. More specifically, reliability requirements that are greater than one failure per million ($>10^{-6}$) hours of operation are not uncommon.

For example, in aircraft the term "flight critical" is applicable. In certain instances, a failure indication, or an indication of a function that is diminishing below normal and approaching possible failure, warns the aircraft personnel that as landing is either urgent (within 20 minutes, for example) or that safe flying has a measured time, one hour for example, and that a location for a safe landing should be determined within that time. In such operating conditions, false positives cannot be tolerated. An indication of an important failure, if due to sensor failure, could require an aircraft to needlessly land, or to shut down major machinery or a processing plant.

To reduce false positives to acceptable levels, that is, close to zero, sensor redundancy has been used. However, in aircraft, again as an example, a redundant sensor assembly may well not be an acceptable alternative. Such a limitation may be due to size or weight limitations, or the fact that no space or openings are possible far a second sensor assembly.

An example of a prior art fluid flow or liquid level sensor is shown in FIG. 1. The sensor head assembly has two thermowells 2 and 3 configured to extend into the fluid to be sensed. One of the thermowells is an active sensor and the other is a reference sensor. As stated above, to achieve redundancy, two such sensor head assemblies would need to be mounted through the wall of a conduit in reasonably close proximity so that two separate signals can be processed and compared. For the reasons stated, such dual installations are not practical, or even possible, in many cases.

SUMMARY OF THE EMBODIMENTS OF THE INVENTION

It is a purpose of this apparatus to achieve a very high level of reliability while maintaining low weight, size, and power consumption in sensing fluid flow or liquid level of a medium or process fluid. The switch design disclosed herein greatly increases the reliability of such a sensor by providing fully redundant and separated output signals which are matched or compared, the sensor arrangement being in the same outline dimension envelope as previously provided in single sensor designs. This is accomplished while maintaining a single installation location on the system. The device assures continued operation in spite of a failure to one of the two redundant channels, thereby reducing the probability of an erroneous low flow or dry signal caused by a single sensor failure. A possible consequence of an erroneous low flow or dry signal includes shutting down a very complex processing plant at an extremely high cost. It is important that there not be false indications of those types, that is, false positives are to be avoided to the highest possible degree.

In another embodiment, the dual sensor arrangement can be employed to provide two separate signals which are coupled in a manner to provide an advance warning signal when the flow or condition being monitored is reducing to a caution level, followed by an alarm signal if a critical situation is reached.

The term RTD (resistance temperature detectors) will be used generally herein to refer to the sensor elements.

BRIEF DESCRIPTION OF THE DRAWING

The purposes, features, and advantages of the disclosed device will be more readily perceived from the following detailed description, when read in conjunction with the accompanying drawing, wherein.

DETAILED DESCRIPTION OF THE PREFERRED EMBODIMENTS

Figure 1:
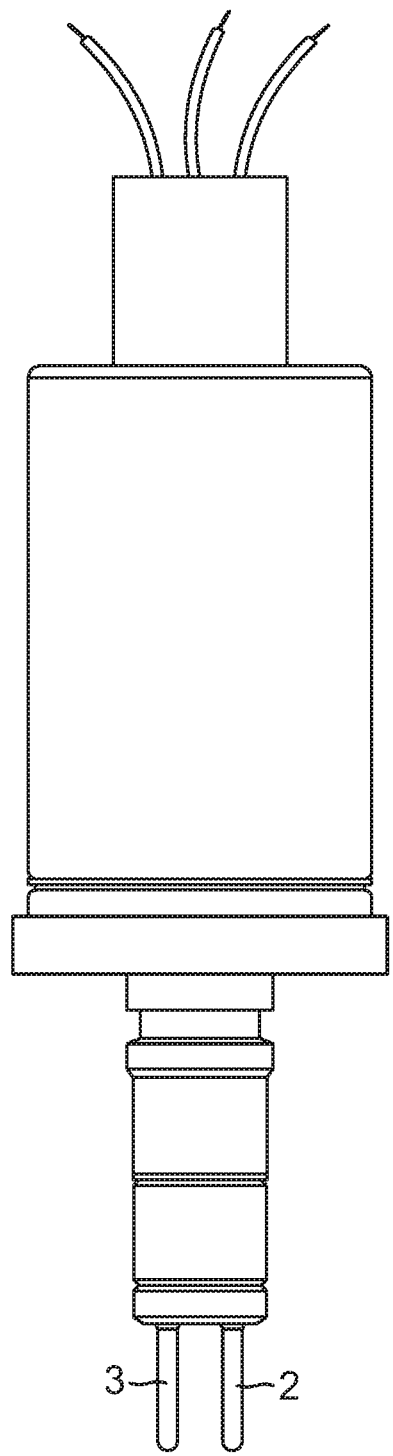
FIG. 1 is an elevation view of a prior art sensor assembly.

With reference now to the drawing, a dual compact sensor head design is shown for applications where reliability is of great importance. This system provides dual output signals in order to achieve the desired reliability.

Figure 2:
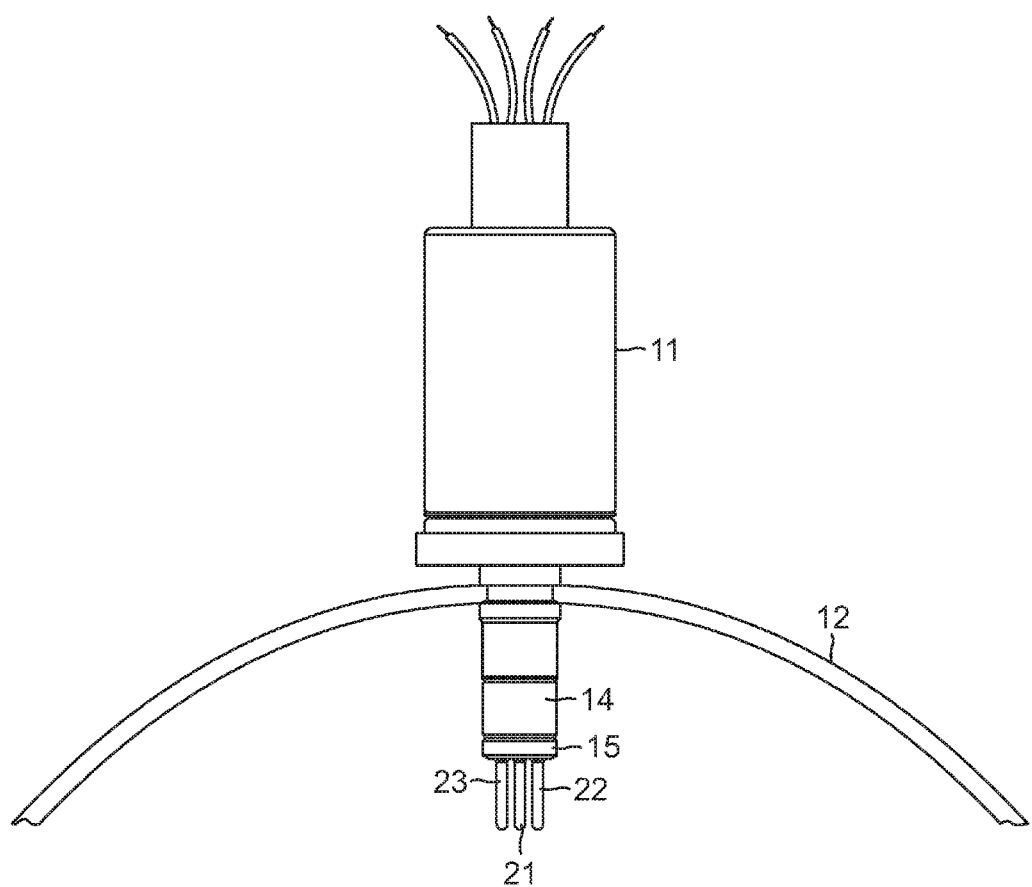
FIG. 2 is an elevation view of a sensor assembly in accordance with the present concept.
Figure 3:
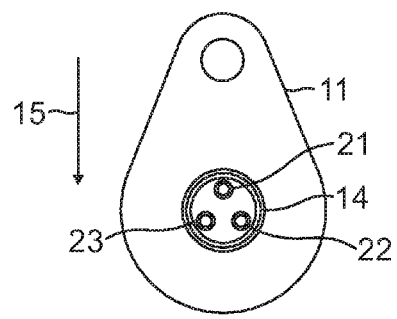
FIG. 3 is an end view of the sensor assembly of FIG. 2.

As shown in FIG. 2, sensor head assembly 11 is mounted in the wall of conduit or container 12, with sensor elements extending into the interior of the conduit or container. The sensor elements are mounted on the proximal end of housing 14 which extends through conduit wall 12 into the fluid flow or liquid within the conduit. In a fluid flow conduit installation the direction of flow is shown by arrow 15 in FIG. 3. The upper portion of assembly 11, which extends upwardly as shown in FIG. 2 away from conduit 12, may be referred to as the distal end.

At the end of housing 14 are sensors or thermowells 21, 22, and 23. Reference thermowell 21 encompasses two separate RID sensors. Active thermowell 22 has a single active RTD therein, together with a heating element. Similarly, active thermowell 23 has a single active RTD therein, also with a heating element. The result, when coupled with their respective electronics, is effectively two separate sensing assemblies in very compact envelopes.

A first sensor assembly is comprised of a first independent reference RTD sensor within thermowell 21, in association with the active RTD sensor within thermowell 22. A second sensor assembly is comprised of a second independent reference RTD sensor within thermowell 21, in association with the active RTD sensor within the thermowell 23.

Each active sensor includes a thin film heater and an RTD, chosen for their small size which offers packaging advantages. Such sensor devices, that is, heated RTDs in thermowells, are conventional and need not be described in structural detail here.

Figure 5:
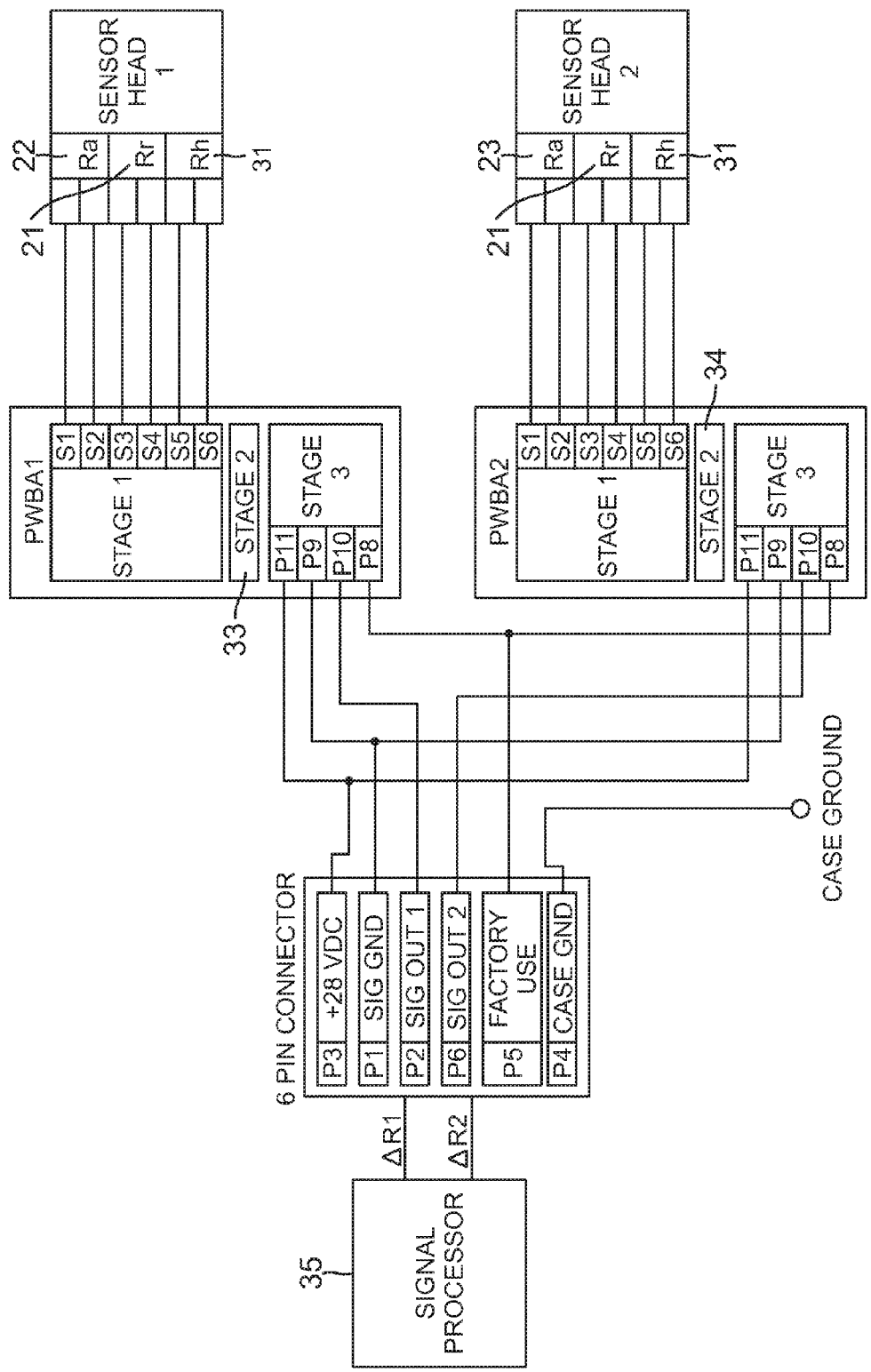
FIG. 5 is a schematic diagram of the signal processor and circuit board arrangement with which the sensor assembly of FIG. 2 can operate.

This fluid flow and liquid level switch works on a thermal dispersion principle of operation that utilizes a low wattage heater to warm an RTD temperature sensor to a temperature somewhat higher than the background temperature of the process fluid or media. A second RTD temperature sensor senses the background media temperature. With reference to FIG. 5, each circuit board (PWBA1 and PWBA2) compares the temperature of the respective warmed RTD to the unheated RTD and determines the difference as a differential resistance, Delta R ($\Delta R$). The $\Delta R$ is highest at no flow or dry (for liquid level), and lowest at high flow or wet. The circuit boards are equipped with an adjustment digital potentiometer (33 and 34 in stages 2) that permits a switch point to be set at a predetermined $\Delta R$. This $\Delta R$ switch point, in one embodiment, corresponds to an alarm flow rate in the process fluid for flow switch applications, or to an alarm wet/dry state change in liquid level switch applications. The switch point is repeatable over a wide range of temperature and pressure conditions in the process fluid.

This thermal dispersion principle of operation applies to each sensor assembly independently. This is achieved by employing two independent circuit boards, as shown in FIG. 5. Board PWBA1 is connected to heater 31, active sensor 22, and reference sensor 21, and board PWBA 2 is connected to heater 31, active sensor 23, and its associated reference sensor 21. This system produces two independent output signals, represented by $\Delta R1$ and $\Delta R2$, through an interface connector from pins P2 and P6 to signal processor 35, as shown in FIG. 5. Comparing the two independent outputs for a given operating condition allows the operator or system to rule out with great certainty a sensor-induced false positive failure reading. More specifically, when the output signal from active sensor 22 matches the output signal from active sensor 23, the outputs can be trusted to an extremely high level. Thus, if both sensors 22 and 23 provide outputs that match and indicate that fluid flow or liquid level is within desired values, the operator or processing functions of the signal processor, has a very high level of confidence that no system problems exist with respect to the fluid medium being sensed by the sensors of FIG. 2.

On the other hand, if both sensor circuits 21, 22 and 21, 23 indicate low level or low flow in an alarm state, the operator or the system with which the sensor arrangement of FIG. 2 operates, the signal processor will enunciate an alarm condition for the operator to take appropriate action. For a processing plant that may entail shut down. For an aircraft, that could mean a landing is necessary within the next few minutes.

A third condition is when the outputs of sensor circuits 21, 22 and 21, 23 do not match. That would most likely indicate that some aspect of a sensor circuit (active sensor, heater, reference sensor, or circuit board) has failed in some way. Any kind of indication can be provided to the operator or to the functioning system and if the system is relatively sophisticated, real time diagnostic tests may be performed to determine, if possible, the source of the sensor failure. Once the failure is identified, the fact that the anomaly is due to one aspect of the sensing system is confirmed, and repairs can be scheduled at some convenient time, without shutting down the processing plant or making an unscheduled aircraft landing.

From the above, it can be perceived that signal processor 35 may effectively control the entire processing plant or the aircraft with respect to the medium being sensed by the dual sensor arrangement of FIGS. 2-5.

Additionally, the outputs afforded by this dual sensor system can be set to indicate that the fluid flow or liquid level is being monitored with respect to specific set points. For this purpose, each sensor pair, 21, 22 and 21, 23, can be established with separate set points. As an example, normal flow of a medium in a conduit may be 5× and that could be termed a green condition. One sensor pair, 21, 22, may have its output coupled to the signal processor with an advance warning, a caution or yellow condition, at 1×. The other sensor pair 21, 23, might be associated with a set point of 0.3×, an alarm or critical condition.

Thus, the same dual sensor apparatus of FIG. 2 can provide flow information with two different set points, as determined by settings in the signal processor. The signal processor can be enabled to provide any kind of visual or audible indication, or it can be enabled to shut down a system.

Figure 4:
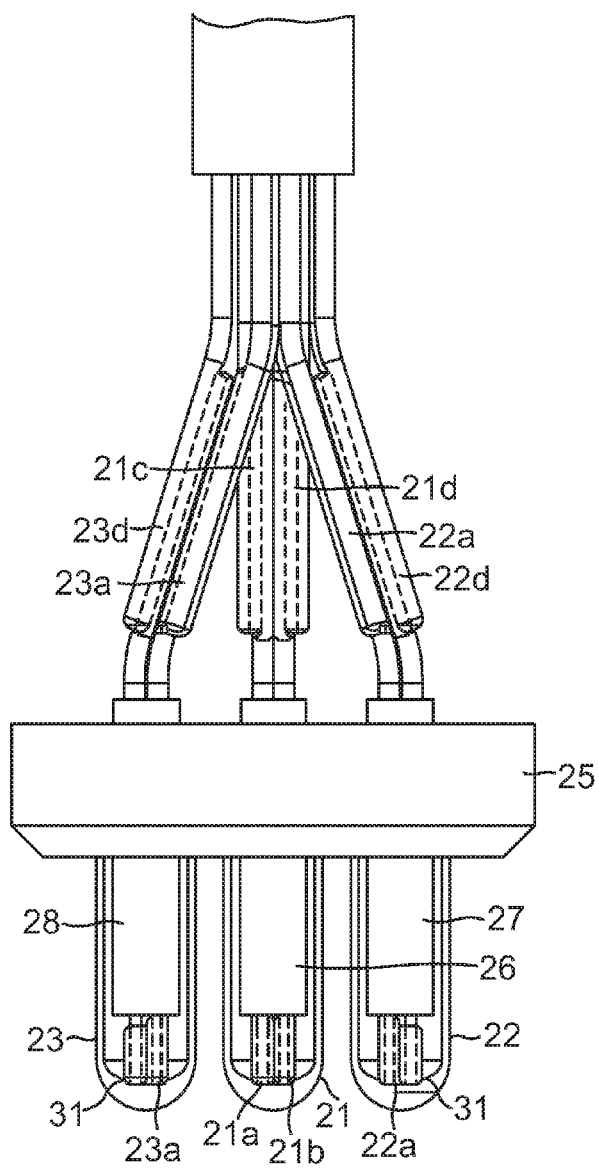
FIG. 4 is an enlarged schematic an partially cut away view of the sensing elements of FIG. 2.

FIG. 4 is provided to show more explicitly the dual sensor assembly structure of FIG. 2. Flange 25 is the end of housing 14 and the tubes constituting thermowells 21, 22, and 23 are mounted to flange 25. Within each tube are two elements connected by wires to appropriate connectors of the circuit boards of FIG. 5.

Within then thermowell 21 are two RTDs, 21a and 21b. These are individual reference sensors which operate as do reference sensors in conventional thermal type flow and level sensors. Signal wires 21c and 21d connect to the circuit boards in head assembly 11. Only two such wires are shown but each sensor element has two wires, so there are four wires extending up through each thermowell.

Within thermowell 22 are RTD 22a and a heating element 31. Within thermowell 23 are RTD 23a and a heating element 31. These constitute the heated, or active, sensors in the system. Wires for heating, 22d and 23d, and two wires for signals (visually behind the wires shown in FIG. 4 above flange 25), are connected to the circuit boards in head assembly 11.

Figure 4A:
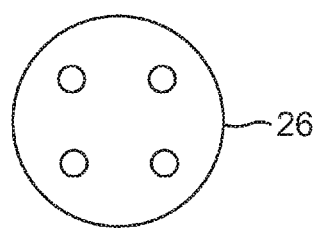
FIG. 4A is an end view of an internal sleeve shown in FIG. 4.

Cylindrical sleeves 26, 27, and 28 provide positioning stability for the RTDs, heaters, and wires leading away from the elements within the ends of the thermowells 21, 22, and 23. Each sleeve is formed with four holes therethrough, which are parallel to the axes of the cylinders. An end view of sleeve 26 is shown in FIG. 4A. Each sleeve 26, 27, and 28 is identical. After the sensors, heaters, wires, and sleeves are assembled, the remaining space within each thermowell tube is preferably filled with a potting material.

To put the size of the RTDs, wires, and ceramic sleeves in perspective, the outside diameter of each thermowell may be approximately 0.10 inch. This is only an example, provided for visualization reference purposes.

The term, RTD, is employed herein to broadly refer to any sensor element that may be applicable to this system. While RTDs, in their various forms, are preferred, other elements such as thermistors, or thermocouples, or other electro thermal devices may be used as the thermal sensors. Sleeves 26, 27, and 28 may be made of ceramic or any other relatively rigid substance having characteristics similar to ceramic.

What is claimed is:

1. A dual sensor head assembly for sensing fluid flow or liquid level of media and to provide signals to a signal processor, the sensor head assembly comprising:
   a sensor head configured for mounting in a fluid flow conduit wall or in a liquid container wall, said sensor head having a distal end configured to be located outside the conduit or container;
   circuit boards in said sensor head, said circuit boards being configured to connect independent output signals of differential resistance ($\Delta R$) to the signal processor;
   a housing on the proximal end of said sensor head and configured to extend into the interior of the conduit or container;
   a first thermowell extending generally axially from the proximal end of said sensor head, said first thermowell having first and second independent reference sensor elements therein, each said reference sensor element providing output signals indicative of the temperature of the sensed media;
   a second thermowell extending from said sensor head generally parallel with said first thermowell, said second thermowell having a first active sensor element and a first heater element therein for heating said first active sensor element, said first active sensor element providing a first output signal indicative of the flow or liquid level of the sensed media;
   a third thermowell extending from said sensor head generally parallel with said first and second thermowells, said third thermowell having a second active sensor element and a second heater element therein for heating said second active sensor element, said second active sensor element providing a second output signal indicative of the fluid flow or liquid level of the sensed media;
   the output signal from said first reference sensor element and said first active sensor element being connected to a first said circuit board, the output of which is a first $\Delta R$ signal, the output signal from said second reference sensor element and said second active sensor element being connected to a second circuit board, the output of which is a second $\Delta R$ signal; and
   the signal processor being configured to compare the $\Delta R$ signals from the first and second circuit boards to provide an indication of defect of the sensor head assembly when the sensor signals do not match, to provide a normal operation indication when both $\Delta R$ signals match and each $\Delta R$ signal indicates normal fluid flow or liquid level in the sensed media, and to provide an alarm indication when both $\Delta R$ signals match and each $\Delta R$ signal indicates an alarm condition in the sensed media and for other signal processing purposes.

2. The apparatus of claim 1, wherein said reference sensors and said active sensors are resistance temperature detectors (RTDS).

3. The apparatus of claim 1, and further comprising sleeves within each said thermowell which are electrically and thermally insulative and are formed with longitudinal bores therethrough, each said bore providing passage for a signal wire from said respective sensor element and beater element to said circuit boards.

4. A sensor apparatus to provide independent signals to a signal processor, the sensor apparatus comprising:
   a dual sensor head assembly arranged to provide independent sensor signals to said signal processor, said sensor head assembly comprising:
   a sensor head configured for mounting in a fluid flow conduit wall or in a liquid container wall, said sensor head having a distal end configured to be located outside the conduit or container;
   circuit boards in said sensor head, said circuit boards being configured to connect independent output signals of differential resistance ($\Delta R$) to the signal processor;
   a housing on the proximal end of said sensor head and configured to extend into the interior of the conduit or container;
   a first thermowell extending generally axially from the proximal end of said sensor head, said first thermowell having first and second independent reference sensor elements therein, each said reference sensor element providing output signals indicative of the temperature of the sensed media;
   a second thermowell extending from said sensor head generally parallel with said first thermowell, said second thermowell having a first active sensor element and a first heater element therein for heating said first active sensor element, said first active sensor element providing a first output signal indicative of the fluid flow or liquid level of the sensed media;
   a third thermowell extending from said sensor head generally parallel with said first and second thermowells, said third thermowell having a second active sensor element and a second heater element therein for heating said second active sensor element, said second active sensor element providing a second output signal indicative of the fluid flow or liquid level of the sensed media;
   the output signal from said first reference sensor element and said first active sensor element being connected to a first said circuit board; the output of which is a first $\Delta R$ signal, the output signal from said second reference sensor element and said second active sensor element being connected to a second circuit board, the output of which is a second $\Delta R$ signal, the first and second $\Delta R$ signals being transmittable to the signal processor which is configured to compare the $\Delta R$ signals to provide an indication of defect when the sensor signals do not match, to provide a normal operation indication when both sensor signals match and each sensor signal indicates normal fluid flow or liquid level in the sensed media, and to provide an alarm indication when both sensor signals match and each sensor signal indicates an alarm condition in the sensed media;
   the first $\Delta R$ switch point be set to indicate a non-critical condition of the system; and
   the second $\Delta R$ switch point being set to indicate a critical condition of the system.

5. The apparatus of claim 4, wherein said reference sensors and stud active sensors are resistance temperature detectors (RTDs).

6. The apparatus of claim 4, and further comprising sleeves within each said thermowell which are electrically and thermally insulative and are formed with longitudinal bores therethrough, each said bore providing passage for a signal wire from said respective sensor element and heater element to said circuit boards.

7. A dual sensor head assembly to provide signals to a signal processor, the signal processor being configured to compare differential resistance $\Delta R$ signals to provide an indication of defect of the sensor head assembly when the ΔR signals do not match, to provide a normal operation indication when both ΔR signals match and each ΔR signal indicates normal fluid flow or liquid level in the sensed media, and to provide an alarm indication when both ΔR signals match and each ΔR signal indicates an alarm condition in the sensed media, and for other signal processing purposes, the sensor head assembly comprising:

a sensor head configured for mounting in a fluid flow conduit wall or in a liquid container wall, said sensor head having a distal end configured to be located outside the conduit or container;

circuit boards in said sensor head configured to connect output signals to the signal processor;

a housing on the proximal end of said sensor head and configured to extend into the interior of the conduit or container;

a first thermowell extending generally axially from the proximal end of said sensor head, said first thermowell having first and second reference sensors therein;

a second thermowell extending generally axially from the proximal end of said sensor head, said second thermowell having a first active sensor which provides a first signal indication of fluid flow or liquid level;

a third thermowell extending generally axially from the proximal end of said sensor head, said third thermowell having a second active sensor which provides a second signal indication of fluid flow or liquid level;

a first circuit board to which said first reference sensor and the first signal from said first active sensor are connected to provide a first differential resistance (ΔR) signal;

a second circuit board to which said second reference sensor and the second signal from said second active sensor are connected to provide a second differential resistance (ΔR) signal;

the first ΔR signal having a selectable set point which is independently settable in said first circuit board; and said second ΔR signal having a selectable set point which is independently settable in said second circuit hoard.

8. The apparatus of claim 7, wherein said reference sensors and said active sensors are resistance temperature detectors (RTDs).

9. The apparatus of claim 7, wherein each said active sensor includes a heater element.

10. The apparatus of claim 7, wherein said reference sensors comprise two independent sensors, is reference sensors being coupled to each said active sensor through said circuit boards.

11. The apparatus of claim 7, wherein said first, second, and third thermowells extend in parallel from said sensor head.

12. The sensor head assembly of claim 1, wherein each said ΔR signal has a switch point, said first and second ΔR switch points being independently settable in said respective first and second circuit boards.

13. A dual sensor head assembly for sensing fluid flow or liquid level of media in an operating system and to provide signals to a signal processor, the sensor head assembly comprising:

a sensor head configured for mounting in a fluid flow conduit wall or in a liquid container wall, said sensor head having a distal end configured to be located outside the conduit or container;

circuit boards in said sensor head, said circuit boards being configured to connect independent output signals of differential resistance (ΔR) to the signal processor;

a housing on the proximal end of said sensor head and configured to extend into the interior of the conduit or container;

a first thermowell extending generally axially from the proximal end of said sensor head, said first thermowell having first and second independent reference sensor elements therein, each said reference sensor element providing output signals indicative of the temperature of the sensed media;

a second thermowell extending from said sensor head generally parallel with said first thermowell, said second thermowell having a first active sensor element and a first heater element therein for heating said first active sensor element, said first active sensor element providing a first output signal indicative of the fluid flow or liquid level of the sensed media;

a third thermowell extending from said sensor head generally parallel with said first and second thermowells, said third thermowell having a second active sensor element and a second heater element therein for heating said second active sensor element, said second active sensor element providing a second output signal indicative of the fluid flow or liquid level of the sensed media;

the output signal from said first reference sensor element and said first active sensor element being connected to a first said circuit board, the output of which is a first ΔR signal, the output signal from said second reference sensor element and said second active sensor element being connected to a second circuit board, the output of which is a second ΔR signal, each said ΔR signal having a switch point, said first and second ΔR switch points being independently settable in said respective first and second circuit boards;

the first ΔR switch point being set to indicate a non-critical operating condition of the operating system; and the second ΔR switch point being set to indicate a critical operating condition of the operating system.

* * * * *